United States Patent
Detouillon

(10) Patent No.: US 8,564,536 B2
(45) Date of Patent: Oct. 22, 2013

(54) AUTOMATIC CONFIGURATION METHOD FOR CONTROL KEYS AND A CONTROL DEVICE FOR DISPLAY MEANS, IN PARTICULAR FOR AN AIRCRAFT

(75) Inventor: Gregory Detouillon, Toulouse (FR)

(73) Assignee: Airbus Operations S.A.S., Toulouse (FR)

(*) Notice: Subject to any disclaimer, the term of this patent is extended or adjusted under 35 U.S.C. 154(b) by 510 days.

(21) Appl. No.: 12/547,108

(22) Filed: Aug. 25, 2009

(65) Prior Publication Data

US 2010/0295777 A1    Nov. 25, 2010

(30) Foreign Application Priority Data

Sep. 3, 2008 (FR) ...................................... 08 55916

(51) Int. Cl.
*G09G 5/08* (2006.01)
(52) U.S. Cl.
USPC .......................... 345/157; 345/173; 705/406
(58) Field of Classification Search
None
See application file for complete search history.

(56) References Cited

U.S. PATENT DOCUMENTS

| | | | |
|---|---|---|---|
| 4,802,019 A * | 1/1989 | Harada et al. ................. | 386/282 |
| 6,072,473 A | 6/2000 | Muller et al. | |
| 6,867,711 B1 * | 3/2005 | Langner et al. ............... | 340/979 |
| 7,162,068 B2 * | 1/2007 | Akagi ........................... | 382/132 |
| 7,301,532 B1 | 11/2007 | Dobry | |
| 7,321,318 B2 * | 1/2008 | Crane et al. ................... | 340/971 |
| 7,401,030 B1 * | 7/2008 | Mather et al. ................. | 705/7.11 |
| 2008/0134019 A1 * | 6/2008 | Wake et al. ................... | 715/239 |
| 2009/0055767 A1 * | 2/2009 | Cabaret et al. ................ | 715/771 |

\* cited by examiner

*Primary Examiner* — Van Chow
(74) *Attorney, Agent, or Firm* — Oblon, Spivak, McClelland, Maier & Neustadt, L.L.P.

(57) ABSTRACT

A control device is provided for display means including several screens adapted for displaying several formats. The control device includes several command keys and means for automatic configuration of a command function for display of a format and visualization means associated with the command keys, adapted for respectively assigning to the command keys formats that can be displayed on a screen. The control device is usable in a cockpit of an aircraft.

18 Claims, 5 Drawing Sheets

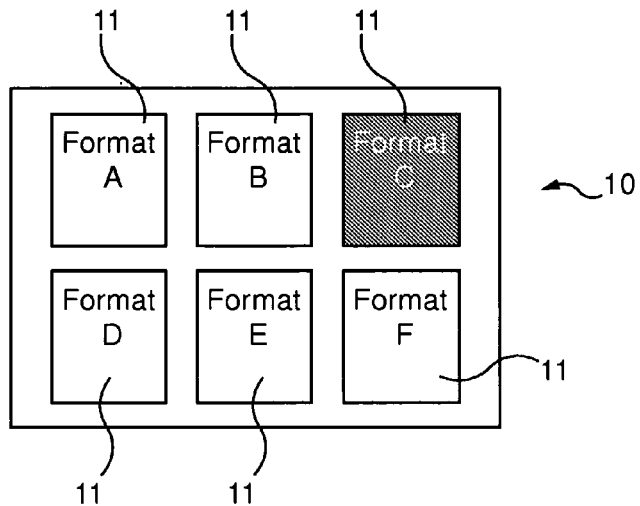
Fig. 2B
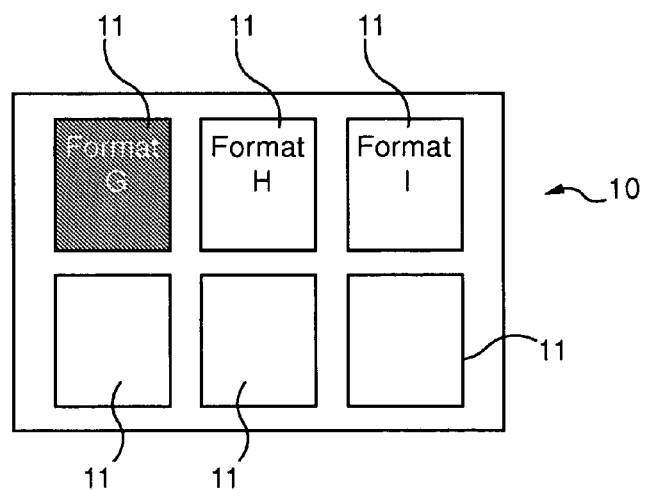
Fig. 2C
Fig. 3
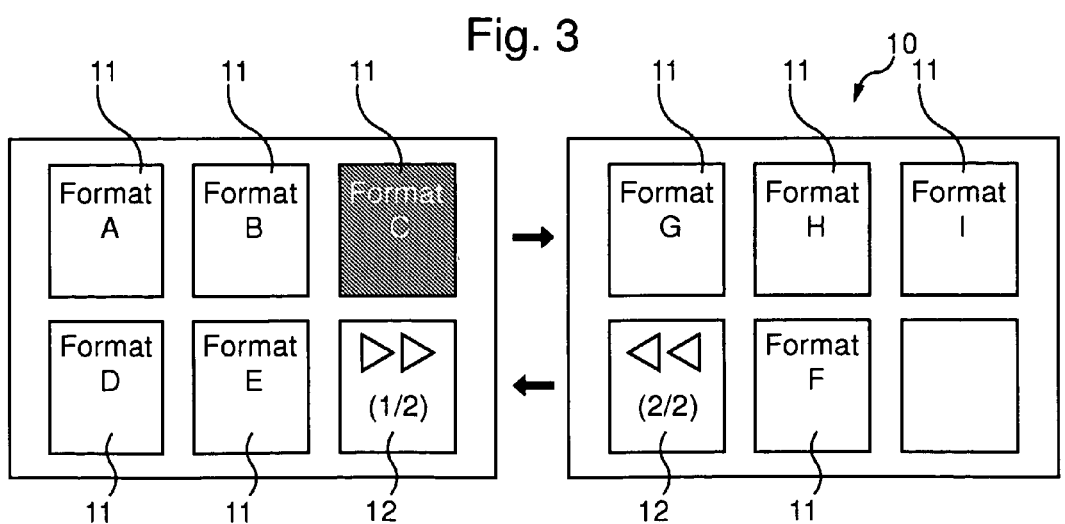

AUTOMATIC CONFIGURATION METHOD FOR CONTROL KEYS AND A CONTROL DEVICE FOR DISPLAY MEANS, IN PARTICULAR FOR AN AIRCRAFT

This invention relates to a method for automatic configuration of command keys of a device for control of display means.

It also relates to a device for control of display means adapted for implementing the method for automatic configuration.

It also applies to a cockpit and an aircraft comprising such a cockpit adapted for using a device for control of display means.

In general, this invention relates to a cockpit of an aircraft (also called in English terminology "cockpit"), and more particularly display means making it possible to present the necessary information items to the pilots.

The display of information items necessary to the flight performance of aircraft has developed considerably since the appearance of the first flight instruments.

In particular, the gradual introduction of electronic flight information systems EFIS (acronym for the English term "Electronic Flight Informations System"), using display screens, has brought a great display flexibility to the information items.

It is possible in particular to adapt the displayed information items according to the needs of the pilots, and especially to make non-permanent certain information items used only in isolated cases.

This development furthermore is accompanied by an ever-increasing need for information items in volume, in order to adapt to the developments in the aeronautical environment.

As a general rule, the information items most critical for flight performance are displayed in permanent manner on certain screens, less critical information items being able to be displayed on request on other screens.

These information items are grouped in coherent manner within different formats or interfaces that can be displayed on each screen.

Considering the ever-increasing volume of information items, however, it sometimes is impossible to keep a few screens dedicated to critical displays.

The loss of the permanent display of critical information items and the multiplication of formats accessible on each screen of the display means in a cockpit can be acceptable only if the desired format and the sought information items can be retrieved easily and quickly by the pilots.

This invention has as its object to propose a method for automatic configuration and a device for control of display means making it possible to manage the displays of each screen effectively, both at the level of its physical accessibility by the pilots and through its simplicity of use.

To this end, this invention applies, according to a first aspect, to a method for automatic configuration of command keys of a device for control of display means comprising several screens, each screen being adapted for displaying one or more formats.

The configuration method comprises the following steps:
  selecting a screen from among the screens of the display means;
  determining a set of formats that can be displayed on the selected screen;
  assigning to the command keys of the control device functions adapted for commanding respectively the display of formats that can be displayed on the selected screen; and
  updating visualization means associated respectively with the command keys with a view to identifying visually the formats assigned respectively to the command keys.

Thus, for each selected screen of the display means, the control device is configured automatically according to the formats accessible on this screen.

In this way the role of the keys and their visual aspect are modified and configured automatically to allow the pilots to access the available formats quickly, by activation of one of the command keys.

According to an advantageous characteristic of the invention, the selection of a screen is implemented from the position of a cursor associated with the display means.

In this way, when a cursor makes it possible to interact with the elements displayed on the screens of the display means, the selection of a screen is made automatically by the positioning of the cursor, the configuration of the command keys of the control device then being modified automatically as soon as the cursor selects a different screen from among the screens of the display means.

Alternatively, the selection of a screen is implemented from a command key of the device for control of the display means.

In this way it is possible to select a screen of the display means independently of the existence or nonexistence of a cursor associated with the display means.

The same device for control of the display means thus makes it possible at the same time to select a screen, then one of the formats that can be displayed on this screen.

This invention also relates, according to a second aspect, to a device for control of display means comprising several screens adapted for displaying several formats.

The control device comprises several command keys and means for automatic configuration of a command function for display of a format and visualization means associated with the command keys, adapted for respectively assigning to the commend keys formats that can be displayed on a screen.

This control device has characteristics and advantages similar to those described above with reference to the method for automatic configuration of command keys according to the invention.

The number of command keys preferably is at least equal to a number of formats that can be displayed on a screen of the display means.

In this way, the set of command keys of the control device makes it possible to propose to a pilot simultaneously the set of formats that can be displayed on the screen of the display means.

Alternatively, the number of command keys is less than the number of formats that can be displayed on a screen of the display means, the means for automatic configuration being adapted for assigning to the command keys at least two formats that can be displayed on a screen according to alternate configurations, one of the command keys being adapted to alternate the configuration of the other command keys, and the number of formats assigned to the other command keys being at least equal to the number of formats that can be displayed on the screen of the display means.

By virtue of a key of the control device making it possible to navigate among the different configurations of the other keys, it is possible to access in relatively simple manner the set of formats that can be displayed on the same screen if the number of command keys available on the control device is less than the number of formats that can be displayed on this screen.

Furthermore, the control device additionally comprises means for automatic configuration of a function for selection of a screen and visualization means associated with the command keys adapted for respectively associating screens of the display means with the command keys.

In this way the same control device makes it possible to select a screen of the display means, making it possible, as indicated above, to do away with a selection by a cursor associated with the display means.

Finally, this invention also relates to a cockpit of an aircraft comprising display means including several screens adapted for displaying one or more formats, including a device for control of the display means according to the invention.

It also relates to an aircraft comprising such a cockpit.

This cockpit and the aircraft comprising such a cockpit have characteristics and advantages similar to those described above with reference to the method for automatic configuration and the device for control of display means according to the invention.

Other features and advantages of the invention also will become apparent in the description below.

In the attached drawings, given by way of non-limitative examples:

FIGS. 2A, 2B and 2C illustrate different types of configuration of a control device according to a first embodiment of the invention;

FIG. 3 illustrates alternate configurations of the control device of FIG. 2A;

There first will be described, with reference to FIG. 1, a cockpit of an aircraft adapted for implementing this invention.

In standard manner, a cockpit of an aircraft includes means for display of information items intended for pilots P1, P2, usually referred to as pilot P1 and copilot P2.

These display means include several screens, each screen being adapted for displaying one or more formats grouping information items necessary for performance of the flight of the aircraft.

Figure 1:
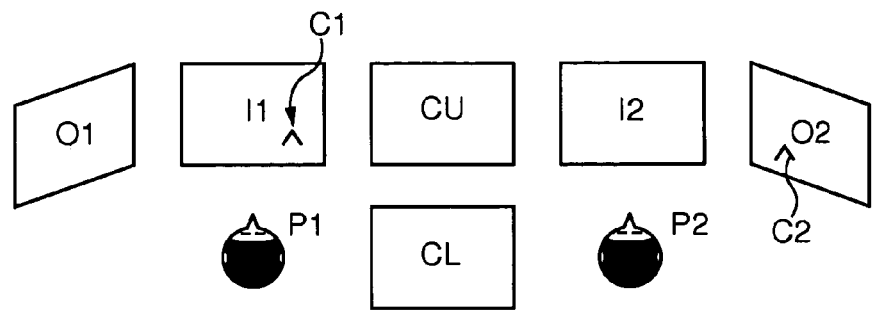
FIG. 1 is a view schematically illustrating display means in a cockpit of an aircraft.

In the embodiment illustrated schematically in FIG. 1, the number of screens in the cockpit is equal, in a manner in no way limitative, to six.

These screens obviously can have different sizes and make it possible to display a full-screen format or else two demi-formats simultaneously.

Here, two screens O1, I1 are accessible to a first pilot P1, two other screens O2, I2 are accessible to a second pilot P2, and two central screens CU, CL are accessible to both pilots P1, P2.

In a first embodiment of the invention, in which a cursor makes it possible to navigate in the different screens of the display means in the cockpit and to interact with the displayed elements, each pilot P1, P2 has assigned to him a cursor C1, C2 as well as a means for controlling the position thereof, and for example a mouse or a touch-sensitive keypad.

The means for control of the position of each cursor are adapted for allowing movement of each cursor only on the screens assigned to the pilots using these control means.

In this way, cursor C1 of pilot P1 can be moved on screens O1, I1, CU and CL, while cursor C2 of pilot P2 can be moved on screens O2, I2, CU, CL in FIG. 1.

Figure 2A:
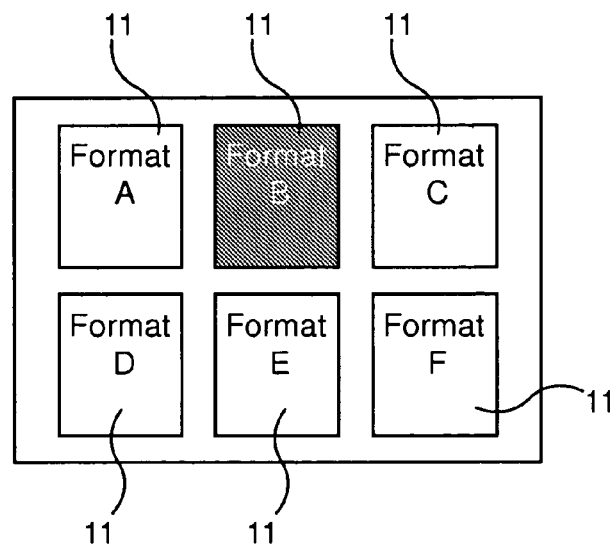

On FIGS. 2A to 2C, there has been illustrated an example of implementation of a device for control of the display means in accordance with a first embodiment of the invention.

This control device 10 comprises several command keys 11, each key 11 being associated with visualization means making it possible to visualize the function of each command key 11.

In practice, each command key 11 includes a small pictogram making it possible to materialize the role of this command key 11.

As described later, since the function of each command key 11 is able to develop according to the context of use, the pictogram is adapted for being configured and for changing in order to adapt to the function assigned to the command key 11.

In practice, this pictogram is presented on a small display device arranged at each command key 11.

The control device 10 in accordance with the invention can be implemented according to different types of technology.

In particular, this control device 10 can include several command keys 11 each having a small screen of OLED (acronym for the English term "Organic Light-Emitting Diode") technology, directly included in a command key projecting from the control device 10.

This type of OLED technology is well known and does not need to be described in detail here.

Alternatively, the command keys can consist of virtual keys of a touch-sensitive screen, each key being visualized by a display screen allowing display of a signaling means depending on the function of the command key.

The use of a virtual-key technology on a touch-sensitive screen allows a great developmental capacity for the control device, as well as its application in any cockpit whatsoever, irrespective of the arrangement of the screens or the number of formats than can be displayed.

Furthermore, this touch-sensitive screen preferentially can be provided with a technology for sensory return at the time of pressure on each virtual key, making it possible to improve the ergonomics during control of the display means by the pilots.

As clearly illustrated on FIG. 2A, a command function for display of a format is associated with each command key 11, the visualization means for each command key 11 making it possible to visualize the name of the format associated with each command key 11.

According to the invention, as soon as a screen is selected, here by the position of one of the cursors C1, C2, the control device includes means for automatic configuration making it possible to assign to each command key 11 a format that can be displayed on the selected screen.

In this way, display at the visualization means and the function of the command keys 11 of the control device 10 are dependent on the screen on which the cursor of the pilot concerned is located.

Of course, each pilot P1, P2 has a different control device available to him, such as illustrated in FIGS. 2A to 2C, allowing him to control the screens which he manages.

In this first implementation, the number of command keys 11 is at least equal to the number of formats that can be displayed on a screen of the display means.

It will be noted in particular that each screen of the display means in the cockpit is adapted, as need be, for displaying a different number of formats.

In this embodiment, the number of command keys 11 of the control device 10 is proportioned according to the screen having the greatest number of formats or combinations of formats that can be displayed.

Thus, in a manner in no way limitative, in this embodiment it is considered that screens O1, I1, CU, CL, I2, O2 of the display means are adapted for displaying at most six different formats.

Control device 10 thus includes six command keys 11 accessible to pilots P1, P2.

By way of example, when cursor C1 of pilot P1 is positioned on screen I1, since this screen I1 is adapted for displaying six different formats (formats A, B, C, D, E, F), control device 10 is configured automatically in order to make it possible to assign to each command key 11 one of six formats A, B, C, D, E, F.

By virtue of the association of a differentiated pictogram with each command key 11, the format assigned to each command key 11 is easily identifiable by the pilot.

As clearly illustrated in FIG. 2A, the current format displayed on screen I1 (for example here format B) is revealed at control device 10 by virtue of a differentiated pictogram (for example by a different color) at the command key 11 to which this format B is assigned.

The designation of the formats, of course, can be representative of the format in question.

For example, the description "Format A" can be replaced by the description "PFD" (for "Primary Flight Display").

As soon as the pilot selects another format to be displayed on the screen I1 on which the cursor C1 is positioned, the visualization means associated with each command key 11 of the control device 10 are updated in order to differentiate the new displayed format, here format C as illustrated in FIG. 2B.

Furthermore, if pilot P1 assigns cursor C1 to another screen in the cockpit, and for example to screen CU, control device 10 is reconfigured automatically, as illustrated in FIG. 2C, to offer to the pilots the formats accessible on this new selected screen CU.

In this embodiment, and in a manner in no way limitative, it is considered that the new selected screen CU can display three different formats (formats G, H and I).

As illustrated in FIG. 2C, the command function for display of a format and the visualization means associated with each command key 11 thus are configured automatically and updated, the current format displayed on the selected screen CU (here format G) being revealed at the displayed pictograms.

Preferably, in order to facilitate the interface with the display means, control device 10 making it possible to select the formats displayed on each screen is arranged close to the means for command of the cursor making it possible to select the screen from among the display means in the cockpit.

In this way, the pilot has only very small motions to make in order to select the screen then the format through one of the command keys 11 of control device 10.

There furthermore has been illustrated in FIG. 3 an alternative to the first embodiment of the invention, in which the number of command keys 11 is less than the maximum number of formats or combinations of formats that can be displayed on one of the screens in the cockpit.

In the embodiment illustrated in FIG. 3, it is considered that at least one of the screens of the visualization means of the cockpit is adapted for displaying more than six different formats, and for example in this embodiment, nine different formats (formats A to I).

The means for automatic configuration of the control device 10 then are adapted for assigning to the command keys 11 at least two different formats that can be displayed on a screen, according to alternate configurations of these command keys 11.

Thus, in FIG. 3, one of the command keys 11 is adapted in alternate manner for being assigned either format A, or format G.

One of the command keys 12 then is adapted for alternating the configuration of the other keys. This navigation key 12 is dedicated to navigating among different configurations of the other command keys 11 of the control device.

It will be noted that in each configuration, the control device 10 makes it possible to have access to a reduced number of formats in comparison with the number of formats accessible on the screen of the visualization means.

On the other hand, the total number of formats assigned to the command keys 11 is at least equal to the number of formats that can be displayed on this screen of the display means.

The set of alternate configurations of command keys 11 thus makes it possible to cover the set of formats that can be displayed on the screen.

It will be noted in particular that if certain formats are more important than others, certain command keys 11 can be reserved for a single format at the time of automatic configuration, irrespective of the alternation of the configurations, the other command keys 11 making it possible to cover other formats of lesser importance.

In this way, irrespective of the alternation of the configuration of the command keys 11, the most important formats can remain permanently accessible to the pilots.

Furthermore, although the navigation key 12 is illustrated in FIG. 3 in order to allow an alternation between two configuration modes, the number of alternate configurations can be different, and in particular in excess of or equal to three.

Figure 4:
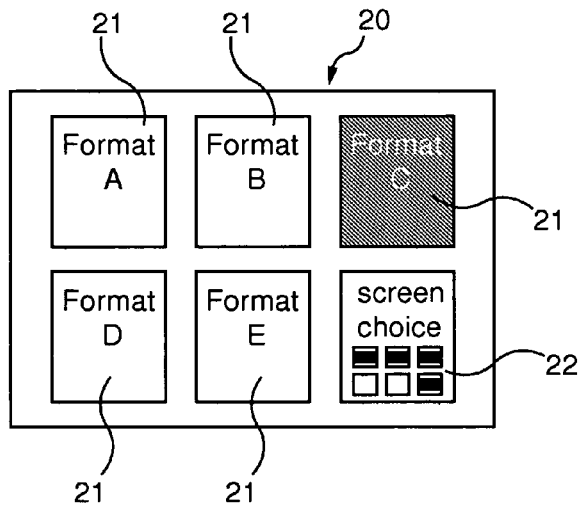
FIG. 4 illustrates a configuration of a control device according to a second embodiment of the invention.
Figure 5:
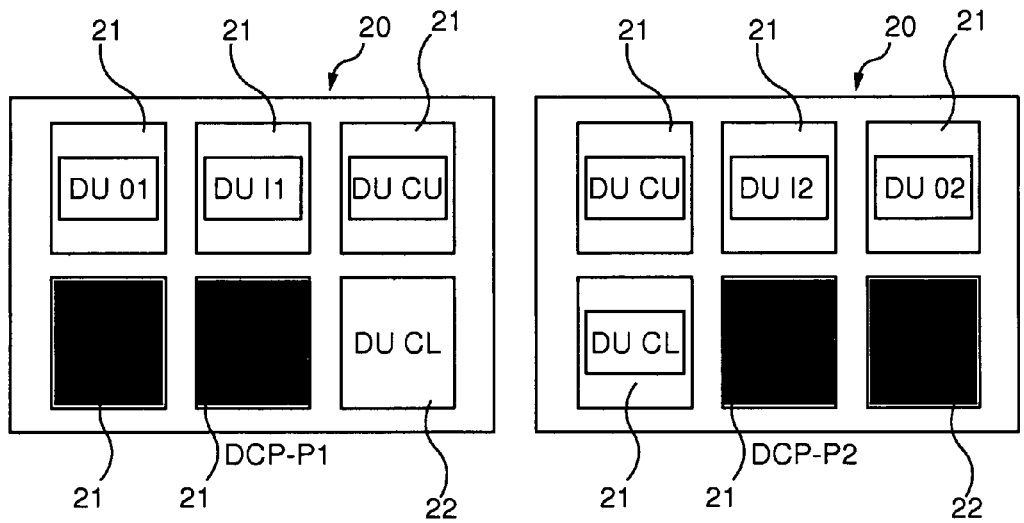
FIG. 5 illustrates different configurations of the control device of FIG. 4.

In FIGS. 4 and 5 there has been illustrated a second embodiment of the invention in which the control device makes it possible to control the display means in a cockpit independently of the existence or non-existence of a cursor.

In a second embodiment, the control device 20 can be configured in order furthermore to permit the selection of a screen from among the display means in the cockpit.

In this embodiment, the choice of a display format then is made from control device 20 in two steps.

First, control device 20 makes it possible to select a screen in the cockpit, then to determine the format or the combination of formats to be displayed on this screen.

Control device 20 thus comprises, as illustrated in FIG. 4, a selection key 22 making it possible to alternate the functioning mode of control device 20.

As clearly illustrated in FIG. 5, when the screen selection mode is implemented by control device 20, the means for automatic configuration of this device make it possible to associate a screen selection function with each command key 21, 22. The visualization means then are updated in order to facilitate identification of the screen assigned to each command key 21, 22 of control device 20.

The configuration of control devices 20 associated with each pilot P1, P2 has been illustrated in FIG. 5.

In the embodiment illustrated in FIG. 1, in which the display means include six screens, each pilot P1, P2 having access to four screens, including the two screens CU, CL, an example of configuration of command keys 21, 22 of control device 20 is illustrated for each pilot P1, P2.

The assignment of each screen to each command key 21, 22 of control device 20 preferably corresponds geometrically to the physical position of the screens in the cockpit.

Furthermore, the number of command keys 21, 22 of the control device should be at least equal to the number or screens in the cockpit accessible for each pilot P1, P2.

Once the choice of a screen is made, control device 20 swings automatically into a format selection mode such as illustrated in FIG. 4.

Selection of the format then is implemented as described above with reference to the first embodiment of the invention.

Here, the return to the mode for selection of a screen is achieved by virtue of the selection key 22 accessible in the format selection mode illustrated in FIG. 4.

This selection key 22 could be omitted, of course, since control device 20 is adapted for reverting to a screen selection mode such as illustrated in FIG. 5 as soon as a format has been assigned to the selected screen.

If during the selection of a screen an error in manipulation was caused by the pilot, it suffices, in the format selection mode, to select again the format already displayed in order to go back into the screen selection mode of control device 20.

Figure 6:
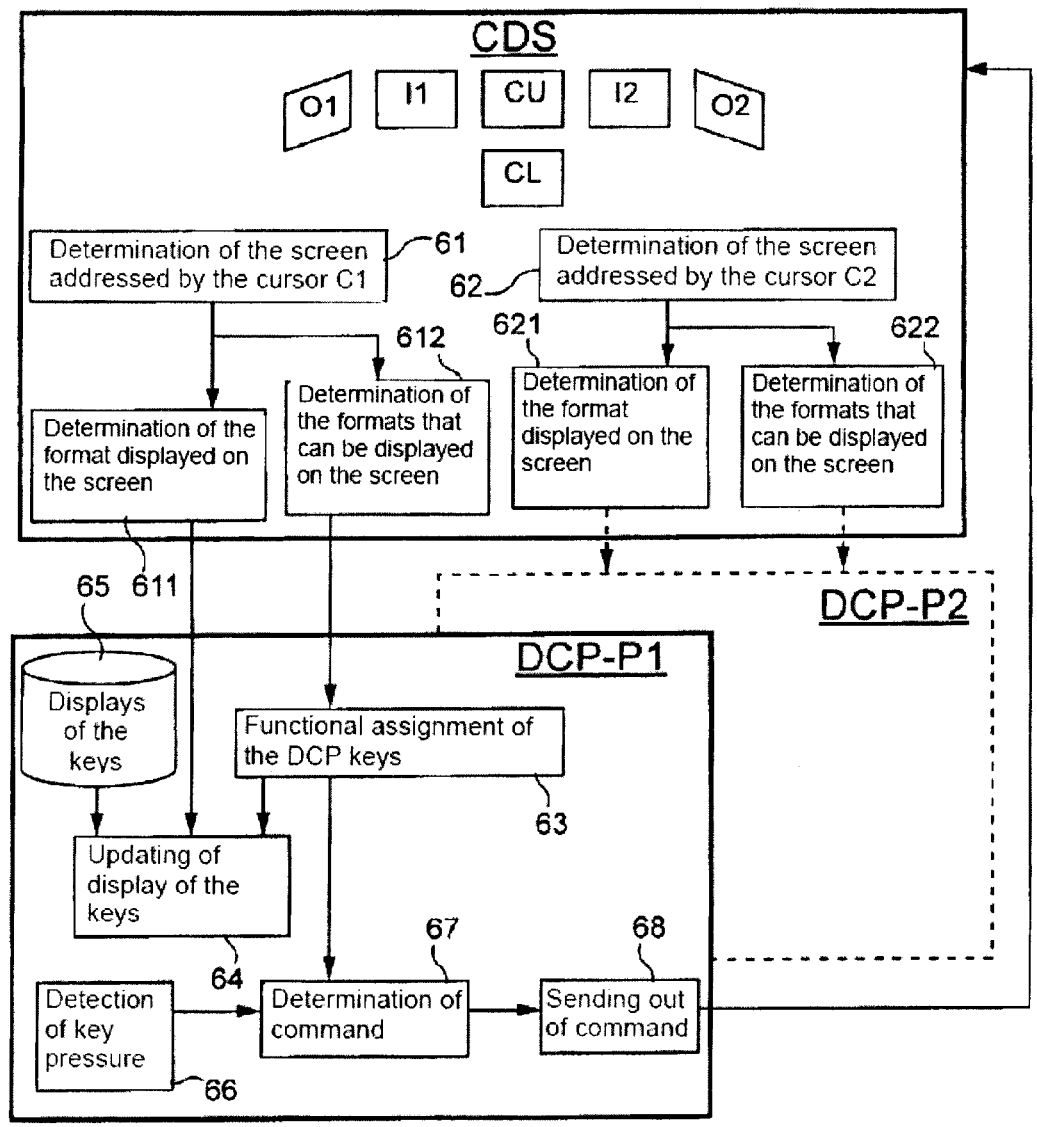
FIG. 6 is a block diagram illustrating a control device adapted for implementing the method for automatic configuration according to the first embodiment of the invention.

The example of a device implemented in a cockpit of an aircraft according to the first embodiment of the invention has been illustrated schematically in FIG. 6.

Thus, each control device DCP (acronym for the English term "Display Control Panel") of each pilot P1, P2 makes it possible to interact with the display system in the cockpit (or CDS, acronym for the English term "Control and Display System").

Only one of the control devices DCP has been illustrated in detail for one of the pilots P1, the second control device for pilot P2 not having been detailed since it possesses functions identical to those that are going to be described below for the first control device DCP.

As illustrated in FIG. 6, the display system CDS includes a certain number of screens, as described above with reference to FIG. 1.

It also includes means for determination 61, 62 of the screen addressed by each cursor C1, C2 commanded by each pilot P1, P2.

These means for determination 61, 62 make it possible to implement a step of selecting a screen from among the screens of the display means.

Furthermore, these means for determination 61, 62 are associated with means for determination 611, 612, 621, 622 on the one hand of the format displayed on the screen selected by each cursor, and on the other hand of the formats that can be displayed on this screen.

These means for determination 611, 612, 621, 622 make it possible to determine the set of formats that can be displayed on the screen selected by the cursor.

This information concerning the formats that can be displayed is sent to means for assignment 63 of functions to command keys of the control device DCP.

These means for assignment 63 make it possible to assign to each command key of control device DCP functions adapted for commanding the display of different formats that can be displayed on the selected screen.

Means for updating 64 of the display of the keys also are provided in control device DCP.

These means for updating 64 cooperate with a database 65 storing the different types of display of the keys according to the role assigned to each of the keys.

These means for updating 64 thus are adapted for updating the visualization means associated with each command key with a view to visually identifying the formats assigned to these command keys.

As described above, these means for updating 64 cooperate on the one hand with the assignment means 63 for determining and assigning to each command key one of the formats that can be displayed, but also with the means for determination 611 of the format displayed on the screen in order to indicate visually to the pilot P1 the current format displayed on the selected screen.

Means for detection 66 of a pressure on one of the command keys then make it possible for the pilot P1 to select a format to be displayed on the screen.

These means for detection 66 of a pressure on a key cooperate with means for determination 67 of a command, according to the format assigned to each command key by assignment means 63.

Means for sending out 68 of a command then make it possible to achieve display of the selected format at the display system CDS.

These means for sending out 68 can be connected in standard manner in hard-wired or unwired form to the display system CDS in order to transmit commands.

This control device DCP illustrated in FIG. 6 thus makes it possible to implement the method for automatic configuration of the command keys when the selection of a screen is implemented from the position of a cursor associated with the display means.

Figure 7:
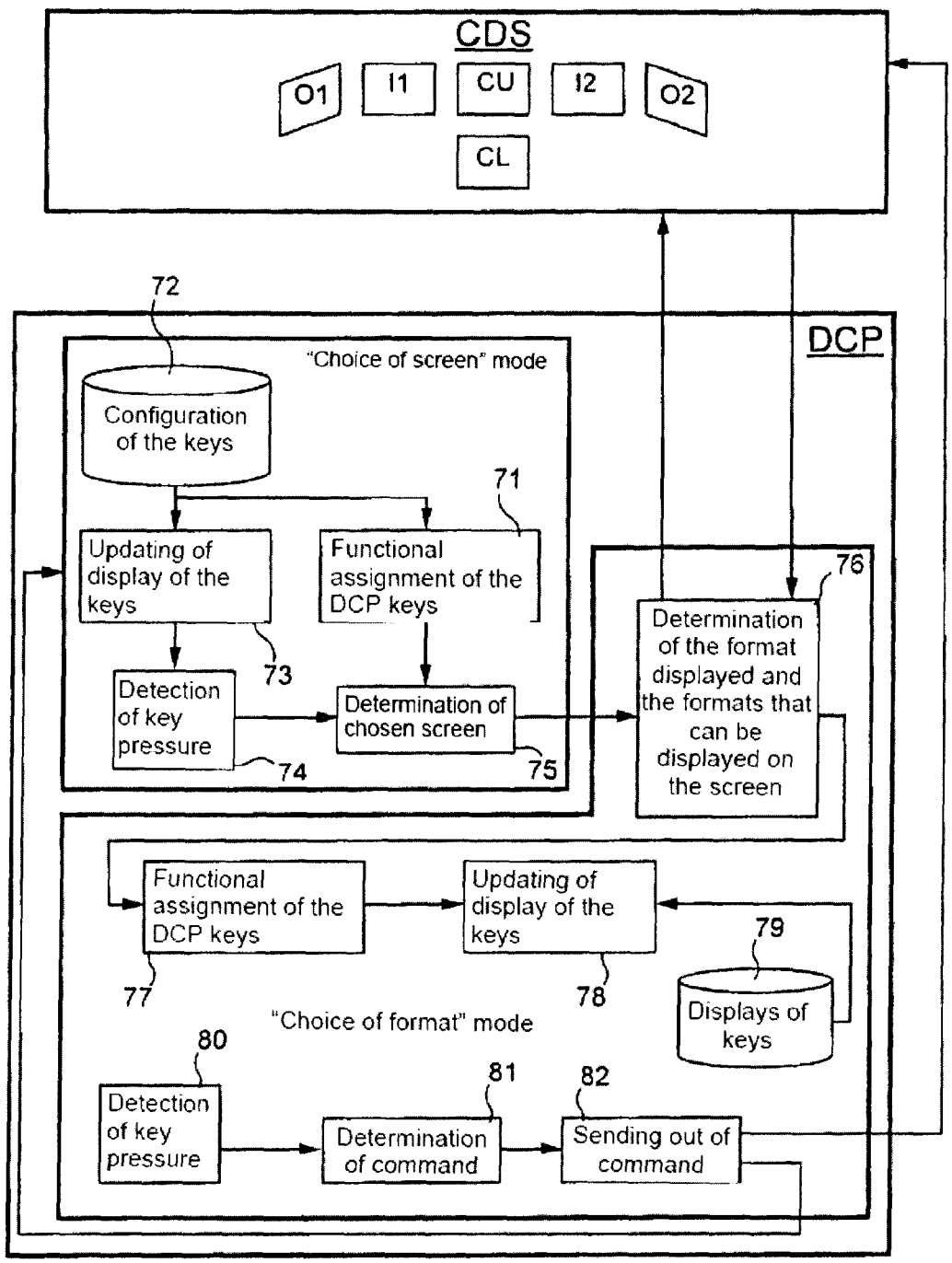
FIG. 7 is a block diagram illustrating a control device adapted for implementing a method for automatic configuration according to the second embodiment of the invention.

There also has been illustrated in FIG. 7 a control device DCP in second embodiment of the invention in which the selection of a screen of the display system CDS is implemented directly from a command key of the control device DCP of the display means.

In this embodiment, the control device DCP is adapted for functioning according to two functional modes, on the one hand for selection of a screen, and on the other hand for assignment of a format on this screen.

As clearly illustrated in FIG. 7, the control device DCP thus includes means for assignment 71 of a function to each command key of the control device DCP making it possible, from a database 72, to configure the keys in a screen selection mode.

Means for updating 73 also make it possible to correspondingly update the visualization means associated with each of the command keys of the control device DCP.

Means for detection 74 of pressure on one of the keys make it possible to activate means for determination 75 of a screen in connection with the assignment of a screen of the display means to each command key.

These means of control device DCP in screen selection mode thus make it possible to implement the step of selection of a screen from among the screens of the display means of the display system CDS.

The information on the selected screen then is transmitted to means for determination 76 of a displayed format and formats that can be displayed on the selected screen.

These means for determination 76 are adapted for requesting an information item concerning the formats that can be displayed and the current format on the display system CDS.

This information then is transmitted by the display system CDS via standard hard-wired or wireless communication means.

These means for determination 76 cooperate with means for assignment 77 of a function to the command keys of control device DCP, making it possible to assign to each of these keys a format to be visualized on the selected screen.

Means for updating 78 also are adapted for cooperating with a database 79 storing the different types of key display to be associated according to the role assigned to each command key.

Finally, as in the embodiment described in FIG. 6, means for detection 80, identical to the means for detection 74 of the screen selection mode, make it possible to detect pressure on a command key of control device DCP.

The detection of a pressure is transferred to means for determination 81 of a command in association with means for assignment 77 of a format to each command key.

Means for sending out 82 then make it possible to send to display system CDS a command for display of the format selected by the pilot.

Simultaneously, means for sending out 82 are adapted for commanding alternation within control device DCP between the format selection mode and the screen selection mode, all the command keys of control device DCP then being updated as described above by means for assignment 71 and for updating 73 of the command keys.

Of course, as indicated above with reference to FIGS. 4 and 5, the alternation between the two functional modes of the control device could be non-automatic.

A dedicated command key could be manipulated by the pilot in order to achieve alternation of the mode for selection of a format with the mode for selection of a screen.

The control devices described above allow the pilots to access very easily and intuitively the different formats that can be displayed on the screens in a cockpit.

Of course, this invention is not limited to the exemplary embodiments described above.

The invention claimed is:

1. A method for automatic configuration of command keys of a device for control of an avionics display including a plurality of screens, each screen being configured to display one or more formats, the method comprising:
    selecting a screen from among the screens of the avionics display responsive to movement of a cursor to a desired screen;
    responsive to said selecting the screen based on the movement of the cursor to the desired screen:
        determining a set of formats that can be displayed on the selected screen, a current display format of the selected screen, and a display format of the command keys,
        assigning to the command keys functions that command the avionics display respectively regarding formats that are displayable on the selected screen, and
        displaying the command keys in the determined display format;
    updating one or more visualization aids associated respectively with the command keys to differentiate the command keys in terms of a current display format of the selected screen; and
    updating the visualization aids to visually identify the formats assigned respectively to the command keys.

2. The method for automatic configuration in accordance with claim 1, wherein said selecting the screen is implemented based on a position of the cursor associated with the avionics display.

3. The method for automatic configuration in accordance with claim 1, further comprising:
    displaying the current display format on the selected screen; and
    switching display from the current display format on the selected screen to a different display format responsive to selection of a corresponding one of the command keys.

4. The method for automatic configuration in accordance with claim 1, wherein said selecting the screen includes movement of the cursor from a currently selected screen to a screen other than the currently selected screen.

5. The method for automatic configuration in accordance with claim 1, wherein each said screen is configured to display a plurality of formats.

6. The method for automatic configuration in accordance with claim 1, wherein at least one of the command keys is reserved for a single format, the single format having a highest priority so as to remain permanently accessible to a pilot.

7. The method for automatic configuration in accordance with claim 1, further comprising assigning each said screen to a corresponding one of the command keys such that the command keys are in correspondence with a geographic arrangement of the screens in a cockpit of an aircraft.

8. A device for control of an avionics display including a plurality of screens configured to display a plurality of formats, the control device comprising:
    a plurality of command keys; and
    control circuitry configured to
        select a screen from among the screens of the avionics display responsive to movement of a cursor to a desired screen,
        determine a display format of the command keys responsive to selection of the desired screen, the display format of the command keys being based on a set of formats displayable on the desired screen,
        assign to the command keys functions that command the avionics display respectively regarding formats that are displayable on the selected screen, and
        displaying the command keys in the determined display format,
    wherein the plurality of command keys include one or more visualization aids associated respectively with the command keys configured to differentiate the command keys in terms of a current display format of a selected screen, and configured to be updated to visually identify the formats assigned respectively to the command keys.

9. The control device in accordance with claim 8, wherein a total number of the command keys is at least equal to a total number of formats that can be displayed on the selected screen of the avionics display.

10. The control device in accordance with claim 8, wherein a total number of command keys is less than a total number of formats that can be displayed on the selected screen of the avionics display, the control device being configured to assign to a group of the command keys at least two formats that can be displayed on the selected screen according to alternate configurations, one of the command keys being configured to alternate the configuration of the group of command keys, and a total number of formats assigned to each of the command keys in the group of command keys being at least equal to the total number of formats that can be displayed on the selected screen of the avionics display.

11. The control device in accordance with one of claims 8 to 10, wherein the command keys are virtual keys of a touch-sensitive screen.

12. A cockpit of an aircraft, comprising:
    the avionics display in accordance with claim 8.

13. An aircraft comprising the cockpit in accordance with claim 12.

14. The control device in accordance with claim 8, wherein the control circuitry is configured to
    display the current display format on one of the screens when said one screen is selected; and
    switch display from the current display format on said one selected screen to a different display format responsive to selection of a corresponding one of the command keys.

15. The control device in accordance with claim 8, wherein at least one of the command keys is reserved for a single format, the single format having a highest priority so as to remain permanently accessible to a pilot.

16. The control device in accordance with claim 8, wherein the control circuitry is configured to assign each said screen to a corresponding one of the command keys such that the command keys are in correspondence with a geographic arrangement of the screens in a cockpit of an aircraft.

17. A method for automatic configuration of command keys of a device for control of an avionics display including a plurality of screens, each screen being configured to display one or more formats, the method comprising:
- selecting a screen from among the screens of the avionics display responsive to movement of a cursor to a desired screen;
- responsive to said selecting the screen based on the movement of the cursor to the desired screen:
  - determining a set of formats that can be displayed on the selected screen, a current display format of the selected screen, and a display format of the command keys,
  - assigning to the command keys functions that command the avionics display respectively regarding formats that are displayable on the selected screen, and
  - displaying the command keys in the determined display format;
- updating one or more visualization aids associated respectively with the command keys to differentiate the command keys in terms of a current display format of the selected screen;
- updating the visualization aids to visually identify the formats assigned respectively to the command keys;
- selecting one of the displayed command keys;
- displaying a display format as the current display format on the selected screen responsive to said selecting one of the displayed command keys; and
- updating one or more of the visual aids of the command keys to visually differentiate one command key to which a displayed current format is assigned.

18. A device for control of an avionics display including a plurality of screens, each screen being configured to display one or more formats, the device comprising:
- a plurality of command keys;
- selection circuitry configured to select a screen from among the screens of the avionics display responsive to movement of a cursor to a desired location;
- determination circuitry configured to determine a set of formats that can be displayed, a current display format on the selected screen, and a format of the command keys;
- assigning circuitry configured to assign to the command keys functions that command the avionics display respectively regarding formats that are displayable on the selected screen; and
- command key display circuitry configured to display the command keys in the determined display format;
- updating circuitry configured to update one or more visualization aids associated respectively with the command keys to differentiate the command keys in terms of a current display format, and to update the visualization aids to visually identify the formats assigned respectively to the command keys; and
- display circuitry configured to display the current format on the selected screen.

* * * * *